(12) United States Patent
Nielsen

(10) Patent No.: US 11,564,352 B2
(45) Date of Patent: Jan. 31, 2023

(54) CONDITIONER UNIT

(71) Applicant: KVERNELAND GROUP KERTEMINDE AS, Kerteminde (DK)

(72) Inventor: Rasmus Elmelund Nielsen, Gudbjerg (DK)

(73) Assignee: Kverneland Group Kerteminde AS, Kerteminde (DK)

( * ) Notice: Subject to any disclaimer, the term of this patent is extended or adjusted under 35 U.S.C. 154(b) by 200 days.

(21) Appl. No.: 16/497,844

(22) PCT Filed: Mar. 29, 2018

(86) PCT No.: PCT/EP2018/058256
§ 371 (c)(1),
(2) Date: Sep. 26, 2019

(87) PCT Pub. No.: WO2018/178318
PCT Pub. Date: Oct. 4, 2018

(65) Prior Publication Data
US 2020/0029503 A1 Jan. 30, 2020

(30) Foreign Application Priority Data
Mar. 31, 2017 (GB) ..................................... 1705251

(51) Int. Cl.
*A01D 43/10* (2006.01)
*A01D 34/66* (2006.01)
(Continued)

(52) U.S. Cl.
CPC ......... *A01D 43/102* (2013.01); *A01D 34/667* (2013.01); *A01D 82/00* (2013.01); *A01D 34/66* (2013.01); *A01D 2101/00* (2013.01)

(58) Field of Classification Search
CPC .... A01D 43/102; A01D 82/00; A01D 34/667; A01D 34/435; A01D 43/535;
(Continued)

(56) References Cited

U.S. PATENT DOCUMENTS

| 4,233,803 A * | 11/1980 | Davis | A01D 43/102 56/14.9 |
| 4,720,962 A * | 1/1988 | Klinner | A01D 43/102 460/105 |

(Continued)

FOREIGN PATENT DOCUMENTS

| EP | 0835603 A2 | 4/1998 |
| EP | 0965260 A1 * | 12/1999 ........... A01D 43/102 |

(Continued)

*Primary Examiner* — Alicia Torres
*Assistant Examiner* — Madeline I Runco
(74) *Attorney, Agent, or Firm* — Dennemeyer & Associates, LLC

(57) ABSTRACT

A conditioner unit (6) for conditioning crop material comprises a rotor (17) having a shaft (18) that carries a plurality of conditioning elements, a drive mechanism for driving rotation of the rotor (17) about an axis, and a deflector element having a working surface (26) that surrounds at least part of the circumference of the rotor (17) to define a conditioning passage through which crop material is transported by rotation of the rotor (17). An adjusting mechanism (30) is provided for adjusting the position of the deflector element relative to the rotor (17), the adjusting mechanism (30) including an actuator (50), a sensor for sensing an operational condition of the conditioning unit (6) and a control system (56) that receives a sensor signal from the sensor and controls actuation of the actuator (50) in response to said sensor signal to provide a desired level of conditioning during operation of the conditioner unit (6).

20 Claims, 5 Drawing Sheets

(51) Int. Cl.
*A01D 82/00* (2006.01)
*A01D 101/00* (2006.01)

(58) Field of Classification Search
CPC ...... A01D 34/736; A01D 34/71; A01D 57/26; A01D 41/1243; A01D 57/24; A01D 34/66; A01D 34/64; A01D 82/02; A01D 43/10; A01D 43/08; A01D 43/085; A01F 29/12; A01F 12/40
See application file for complete search history.

(56) References Cited

U.S. PATENT DOCUMENTS

| | | | | |
|---|---|---|---|---|
| 6,421,994 B1 * | 7/2002 | Boucher | ............. | A01D 43/102 56/192 |
| 7,337,599 B2 * | 3/2008 | Wilhelm | ............. | A01D 43/102 56/16.4 A |
| 7,487,024 B2 * | 2/2009 | Farley | ............... | A01D 41/1243 701/50 |
| 7,993,188 B2 * | 8/2011 | Ritter | ................ | A01D 41/1243 460/111 |
| 8,177,610 B2 * | 5/2012 | Birrell | ................. | A01B 79/005 460/111 |
| 8,196,379 B2 * | 6/2012 | Straeter | ............... | A01D 43/081 56/60 |
| 10,039,230 B2 * | 8/2018 | Vande Ryse | ........... | A01D 61/00 |
| 10,091,935 B2 * | 10/2018 | Treffer | .................. | A01D 57/20 |
| 10,159,185 B2 * | 12/2018 | Straeter | ............... | A01D 41/144 |
| 10,292,323 B2 * | 5/2019 | Missotten | .......... | A01D 41/1243 |
| 10,582,664 B2 * | 3/2020 | Larsen | ................... | A01D 43/10 |
| 10,806,078 B2 * | 10/2020 | Rotole | ................. | A01D 43/102 |
| 10,813,287 B2 * | 10/2020 | Rotole | ................. | A01D 41/127 |
| 10,820,502 B2 * | 11/2020 | Beavers | ................ | A01F 29/12 |
| 10,912,255 B2 * | 2/2021 | Rotole | ................. | A01D 43/102 |
| 2007/0068130 A1 | 3/2007 | Wilhelm | | |
| 2017/0280627 A1 * | 10/2017 | Treffer | ................... | A01D 82/02 |

FOREIGN PATENT DOCUMENTS

| | | | | |
|---|---|---|---|---|
| EP | 0965260 A1 | 12/1999 | | |
| EP | 0970597 A1 | 1/2000 | | |
| EP | 2436259 A1 | 4/2012 | | |
| EP | 3000302 A1 * | 3/2016 | ......... | A01D 41/1243 |
| GB | 2020155 A | 11/1979 | | |
| GB | 2124876 A | 2/1984 | | |

* cited by examiner

CONDITIONER UNIT

CROSS-REFERENCE TO RELATED APPLICATIONS

This application is a national entry under 35 U.S.C. 371 of PCT Application No. PCT/EP2018/058256 filed Mar. 29, 2018, which claims priority to Great Britain Patent Application No. 1705251.5 filed Mar. 31, 2017, which are hereby incorporated by reference in their entirety.

The present invention relates to a conditioner unit for conditioning a cut crop material for use (for example) as fodder or bedding material for animals. The invention also relates to a combined mower-conditioner device for cutting and conditioning a crop material.

When cutting crop material such as grass or alfalfa it is often beneficial to condition the cut crop material with a conditioner unit that bruises or breaks the stalks of the crop material immediately after cutting. This allows moisture to escape more readily from the cut crop material, promoting rapid drying. The cut crop material is usually then laid on the ground in a swath or windrow while it dries, after which the material may be collected up and formed into bales or stored in bulk for later use.

There are two main types of conditioner unit currently in use. The first type is the flail conditioner, comprising a rotor having a shaft that carries a plurality of flail-like conditioning elements, a drive mechanism for driving rotation of the rotor about an axis, and a deflector element or plate having a working surface that surrounds at least part of the circumference of the rotor to define a conditioning passage through which crop material is transported by rotation of the rotor. The flail-like conditioning elements bruise or break the stalks of the crop material as it is transported through the conditioning passage. The present invention relates to this first type of conditioner unit. The second type is the roller conditioner, which has a pair of contra-rotating rollers, which process the crop material by crushing the material as it passes through the nip between the two rollers.

The drying time required for a particular crop will depend on a number of factors including the type of crop, the moisture content, the ambient weather conditions, the quantity of the crop material and the degree of conditioning. Depending on these and other factors (including for example the weather forecast), it may be desirable to adjust the amount of conditioning to control the drying process.

In some circumstances, it may also be desirable to adjust the degree of conditioning continually while conditioning the crop (i.e. during an on-going conditioning process). For example, if the crop has not grown evenly throughout the entire area of a field, it may be desirable to increase the degree of conditioning in some areas of the field (for example where the crop contains more moisture) to improve the drying time, and decrease the amount of conditioning in other areas to improve the energy efficiency of the conditioner unit. It may also be desirable to adjust the conditioning capacity of the conditioner unit, depending on the quantity of crop growing in different areas of a field, to improve the energy efficiency of the conditioner unit.

By controlling the conditioner unit in this way, the food value and quality of the fodder obtained from the cut crop material can be improved, and the fuel economy of the machine used to cut and condition the crop material can be maximised.

U.S. Pat. No. 5,966,913 describes a mower-conditioner that includes a mower unit and a conditioner device for conditioning the cut crop material. The conditioner device includes a transport rotor and a deflector plate (also known as a countermeasure or backplate) that partially surrounds the rotor that defines a conditioning channel through which the cut crop material passes. The deflector plate is supported by a pivot joint at its rear end and an adjusting mechanism is provided at its front end, which allows the position of the deflector plate relative to the rotor to be adjusted. This allows the degree of conditioning to be adjusted. When setting up the conditioning device the user can also select one of two different pivot axes located at the rear end of the plate. The degree of conditioning can thus be adjusted according to the prevailing conditions. However, the adjusting mechanism does not permit the position of the deflector plate to be adjusted during an on-going conditioning operation, and selecting an alternative pivot axis for the deflector plate is a complex and time consuming operation that requires the conditioner unit to be dismantled and reassembled.

EP0965260 describes a processor for a rotary mower, having a rotor shaft with impact tines that feed crop through an adjustable guide channel. The inlet and outlet cross-sections of the guide channel can be increased automatically in the event of overloading to avoid clogging.

A technical problem with the both of the references described above is that they do not enable the position of the deflector element to be adjusted during operation of the conditioner unit to provide a desired level of conditioning. This can result in uneven conditioning of the crop and/or sub-optimal fuel efficiency.

It is an object of the present invention to provide a conditioner unit that mitigates or provides a solution to one or more of the aforesaid problems and/or one or more other problems associated with the prior art.

According to one aspect of the present invention there is provided a conditioner unit for conditioning crop material, the conditioner unit comprising a rotor having a shaft that carries a plurality of conditioning elements, a drive mechanism for driving rotation of the rotor about an axis, a deflector element having a working surface that surrounds at least part of the circumference of the rotor to define a conditioning passage through which crop material is transported by rotation of the rotor, and an adjusting mechanism for adjusting the position of the deflector element relative to the rotor, wherein the adjusting mechanism includes an actuator for adjusting the position of the deflector element, a sensor for sensing an operational condition of the conditioning unit and a control system that receives a sensor signal from the sensor and controls actuation of the actuator in response to said sensor signal to provide a desired level of conditioning during operation of the conditioner unit.

In the preceding paragraph, the term "a deflector element" is intended to encompass both a single (unitary) deflector element and an assembly of partial deflector elements that can be adjustable either individually or as a single unit. Similarly, "an actuator" encompasses one or more actuators, and "a sensor" encompasses one or more sensors. More generally terminology expressed herein in the singular also encompasses the plural.

The adjusting mechanism is able to sense an operational condition of the conditioning unit, for example a force acting on the deflector element or the flow rate of crop material through the conditioner unit, and then adjust the position of the deflector element based on the sensed operational condition to provide a desired level of conditioning during operation of the conditioner unit. This helps to ensure uniform conditioning of the crop and/or improves the operational fuel efficiency of the conditioner unit by increasing the size of the conditioning passage when possible, so as to decrease the rotational resistance acting on the rotor.

The control system may be configured to maintain the desired level of conditioning at a substantially uniform level during operation of the conditioner unit. The desired level of conditioning may be adjustable, depending for example on the amount on conditioning needed for the crop (which may depend, for example, on the moisture content of the crop and/or the prevailing weather conditions). The desired level of conditioning may be adjusted automatically, for example based on sensor signals or known data such as the position of the conditioner within a field, or it may be selected by an operator of the conditioner unit.

The sensor may be configured to sense at least one operational condition selected from a range comprising: a force acting on the deflector element (which may be measured directly, or by sensing the pressure in a hydraulic circuit connected to the actuator, a flow rate of crop material through the conditioning channel, a travelling speed of the conditioner unit, a power consumption value (of the conditioner unit or a towing tractor), or a rotational drive value (e.g. torque, power or speed) of the drive mechanism.

The control system may be configured for automatic control of said actuator.

In an embodiment, the working surface has front and rear ends that define respectively input and output ends of the conditioning passage, the adjusting mechanism being configured to adjust the position of at least one of the ends of the working surface.

In an embodiment, the adjusting mechanism includes a first adjuster element for adjusting the position of the front end of the working surface, and a second adjuster element for adjusting the position of the rear end of the working surface.

The first and second adjuster elements may be independently operable.

In an embodiment, at least one of the adjuster elements comprises said actuator.

In an embodiment, at least one of the adjuster elements comprises a manual adjuster element.

In an embodiment, said manual adjuster element is configured for selectively positioning an end of the working surface in first or second stop positions or at least one intermediate position.

In another embodiment, the conditioner unit comprises a rotor having a shaft that carries a plurality of conditioning elements, a drive mechanism for driving rotation of the rotor about an axis, a deflector element having a working surface that surrounds at least part of the circumference of the rotor to define a conditioning passage through which crop material is transported by rotation of the rotor, the working surface having front and rear ends that define respectively input and output ends of the conditioning passage, and an adjusting mechanism for adjusting the position of the deflector element relative to the rotor, the adjusting mechanism being configured to enable the positions of the front and rear ends of the working surface to be adjusted.

The adjusting mechanism enables the positions of the front and rear ends of the working surface to be readily adjusted relative to the rotor, for example between or during conditioning operations (and preferably without dismantling the conditioning unit). This makes it possible conveniently to adjust the shape and/or size of the conditioning passage as required, for example according to the quantity of crop material to be processed and the required level of conditioning. For example, the separation of the front end of the working surface from the rotor can be increased or decreased to allow a greater or smaller flow rate of crop material through the conditioning channel, and/or the separation of the rear end of the working surface from the rotor can be increased or decreased to provide a smaller or greater degree of conditioning to the crop material passing through the conditioning channel.

In this way the level of conditioning can be optimised, while at the same time operation of the conditioning unit can be adapted to the flow rate of crop material passing through the conditioning channel, to ensure energy-efficient operation. The food quality of the fodder provided by the cut and conditioned crop material can thus be improved, and energy consumption of the conditioning unit can be minimised.

The deflector element may for example comprise a deflector plate, wherein the working surface comprises one face of the deflector plate.

In an embodiment the adjusting mechanism is configured to enable the positions of each of the front and rear ends of the working surface to be adjusted between first and second stop positions and at least one intermediate position. Each end of the working surface can therefore have at least three operating positions, allowing greater control over processing of the crop material. Optionally, each end of the working surface may have multiple intermediate positions and/or be adjustable continuously between the first and second stop positions, allowing an even greater degree of control. Alternatively, the adjusting mechanism may be configured to enable the position only one of the front and rear ends of the working surface to be adjusted.

In an embodiment the adjusting mechanism includes a first adjuster element for adjusting the position of the front end of the working surface relative to the rotor, and a second adjuster element for adjusting the position of the rear end of the working surface relative to the rotor. The adjusting elements are operable to adjust the positions of the front and rear ends of the working surface relative to the rotor. The adjuster elements may for example comprise pivot arms or other elements, and may be manually operable or operable by means of an actuator. The term "adjuster element" as used herein means a control that can be operated to adjust the position of the working surface relative to the rotor in a quick and simple manner, and in particular without dismantling and reassembling the conditioner unit.

The provision of separate adjuster elements for adjusting the positions of the front and rear ends of the working surface makes it simpler to adjust the positions of the front and rear ends independently. Alternatively, a single adjuster element may be provided at each end of the deflector element, which allows independent adjustment of the front and rear ends of the working surface.

In an embodiment the first adjuster element is configured for adjusting the distance between the front end of the working surface and the axis of the rotor.

In an embodiment the second adjuster element is configured for adjusting the distance between the rear end of the working surface and the axis of the rotor.

Optionally, the adjusting mechanism may allow adjustment of the position of the deflector element in other directions, for example in a direction around the circumference of the rotor.

In an embodiment the adjusting mechanism includes an actuator such as a hydraulic or electric actuator for adjusting the position of the deflector element. The actuator may for example be connected to at least one of the first and second adjuster elements for adjusting the adjuster element, or directly to the deflector element.

The adjusting mechanism may include first and second actuators for adjusting respectively the first and second adjuster elements.

The first and second actuators may be independently operable, allowing for example the flow rate of material through the conditioning channel and/or the degree of conditioning to be adjusted independently.

In an embodiment the conditioner unit includes a sensor (or a plurality of sensors) for sensing at least one operational condition of the conditioner unit, and a control system that receives a sensor signal from the (or each) sensor and controls actuation of at least one said actuator in response to said sensor signal(s).

Said sensor may be configured to sense at least one operational condition selected from a range comprising a force acting on the deflector element, a flow rate of crop material through the conditioning channel, and the rotational drive supplied to the rotor (e.g. the drive torque, and/or the rotational speed).

In an embodiment the control system is configured for automatic control of said at least one actuator, or semi-automatic control (with operator input).

In an embodiment the adjusting mechanism includes a manual actuator connected to at least one of the first and second adjuster elements for adjusting the adjuster element.

In an embodiment the conditioner elements comprise flail elements pivotally attached to the shaft of the rotor.

According to another aspect of the invention there is provided a mower-conditioner device comprising a conditioner unit according to any one of the preceding statements of invention, and a mower unit that is configured to cut a crop material and feed the cut crop material to the conditioner unit.

In an embodiment the mower unit comprises a plurality of rotary cutter elements, for example cutter discs or cutter drums that are configured to rotate about a substantially vertical axis, and that carry peripheral knives for cutting the crop material.

An embodiment of the invention will now be described, by way of example, with reference to the accompanying drawings, wherein.

Figure 1:
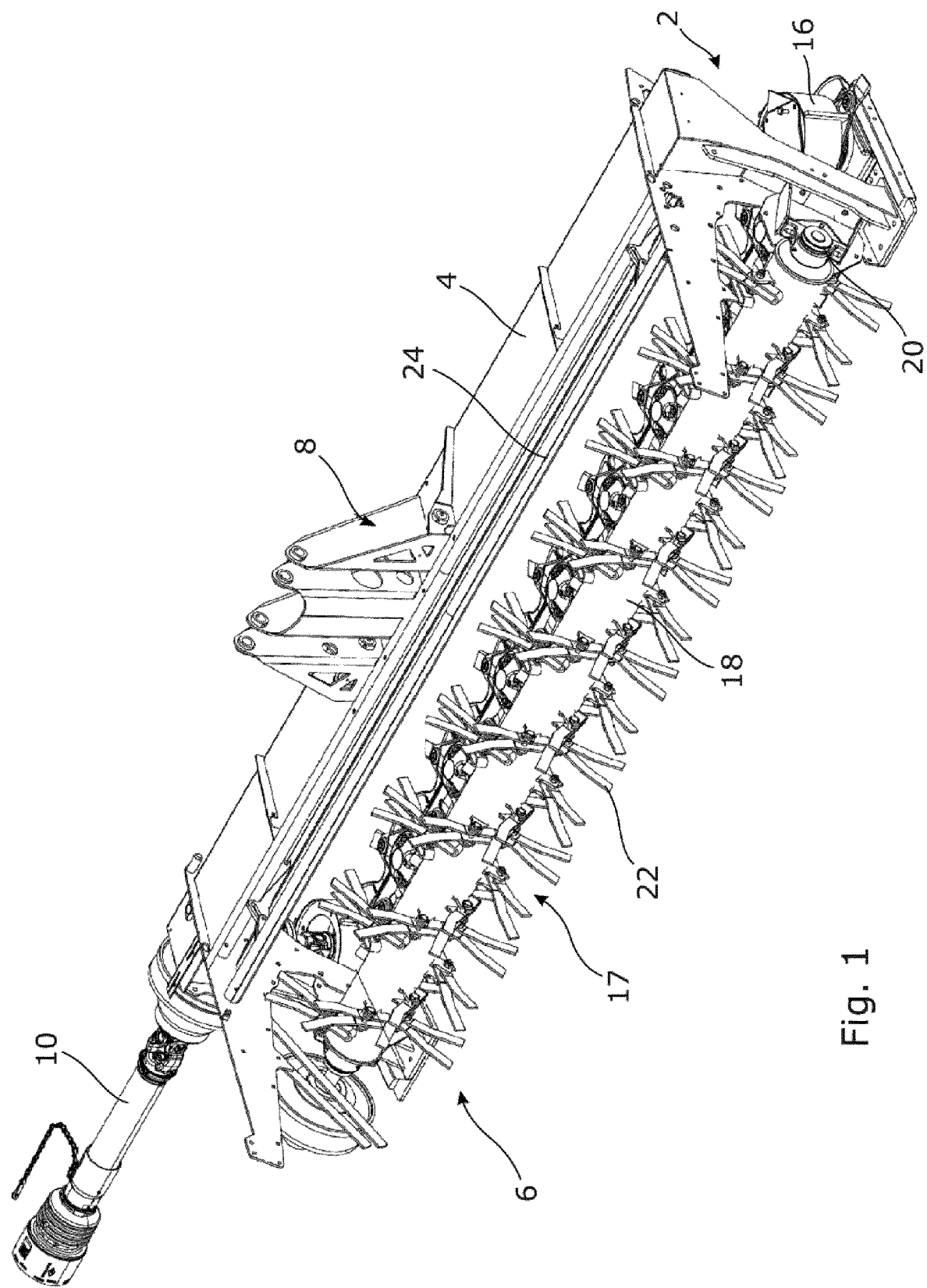
FIG. 1 is an isometric view of a mower conditioner device according to an embodiment of the invention, with the cover removed.
Figure 2:
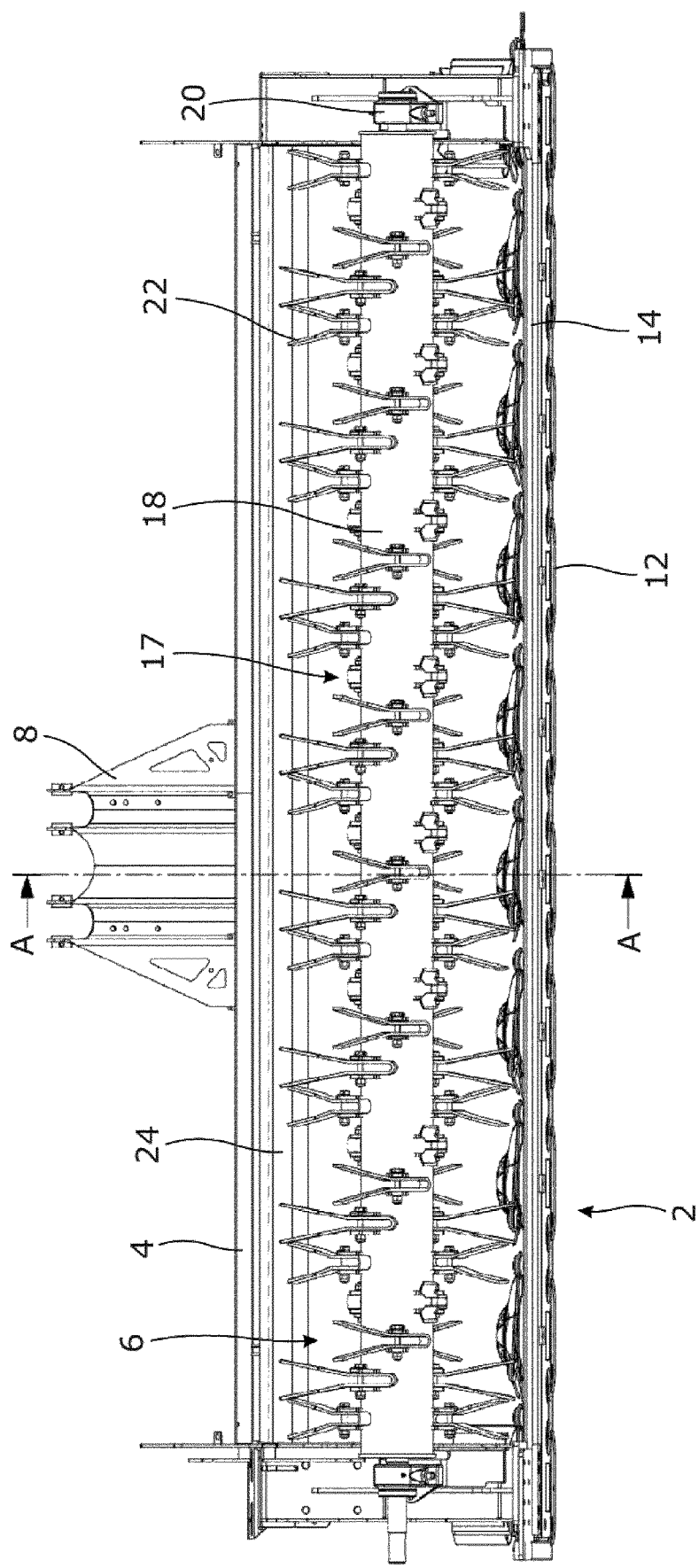
FIG. 2 is a rear view of the conditioner unit, with the cover removed.

The mower-conditioner device shown in FIGS. 1-6 includes a mower unit 2, support frame 4 and a conditioner unit 6. Normally, these components would be covered by a flexible cover, which contains the cut crop material as it is processed by the mower-conditioner, and also prevents stones and other objects struck by the mower unit from flying off. In the drawings the cover has been removed to show the internal components.

In this embodiment shown in FIGS. 1-6 the frame 4 includes a support structure 8 that allows it to be attached to a support arm or other support mechanism. The mower conditioner also includes a drive shaft 10 that takes a rotary drive for example from the power take off unit of a tractor, in order to drive the mower unit 2 and a conditioner unit 6. It should be understood however that the conditioner unit may alternatively be provided as a stand-alone machine, or it may be combined with another crop processing machine.

The mower unit 2 is conventional and includes in this embodiment a plurality of rotary cutter disks 12 that are supported by a cutter bar 14 and configured for rotation about substantially vertical axes. The cutter bar 14 contains a drive mechanism (not shown) for transmitting drive from the drive shaft 10 to the cutter disks. The mower unit 2 also includes a cylindrical cutter drum 16 at each end of the cutter bar, which help to guide cut crop material to the conditioning unit 6.

The conditioner unit 6 includes a transportation rotor 17 comprising a rotary shaft 18 that is supported in rotary bearings 20 at each end of the frame 4. The shaft 18 carries a plurality of finger-like flail elements 22 that are pivotally attached to the shaft 18 and swing outwards as the shaft rotates owing to the centrifugal effect. The tips of the flail elements 22 than define the outer circumference of the rotor 17. The features described above are all conventional and they will not therefore be described in further detail.

The conditioner unit 6 also comprises a deflector plate 24 which in this embodiment is located above and slightly in front of the transportation rotor 17. The lower surface of the deflector plate 24 comprises a working surface 26, which together with the outer circumference of the transportation rotor 17 defines a conditioning channel 28 through which the cut crop material passes. As the cut crop material passes through the conditioning channel 28 it is conditioned by being worked between the tips of the rotating flail elements 22 and the working surface 26 of the deflector plate 24. The working surface 26 of the deflector plate 24 may be ridged, profiled or textured to aid the conditioning process.

In this embodiment of the invention the transportation rotor 17 is configured to operate in an overshoot mode, in which the front part of the rotor rotates upwards and the cut crop material passes over the shaft 18 of the rotor 17. In this configuration the deflector plate 24 is located above the rotor 17 so that the cut crop material is conditioned as it passes over the rotor. It should be understood however that the conditioner unit may alternatively be configured to operate in an undershoot mode, in which the rotor rotates in the opposite direction and the cut crop material passes beneath the shaft 18 of the rotor. In this configuration the deflector plate will be located below the rotor 17 to condition the crop material as it passes beneath the shaft of the rotor.

In this embodiment, the deflector plate 24 is attached to the frame 4 at each end of the deflector plate by an adjusting mechanism 30 that allows the position of the deflector plate 24 to be adjusted relative to the rotor 17. Operation of the adjusting mechanism 30 allows the shape of the conditioning channel 28 to be adjusted and controlled. Alternatively, an adjusting mechanism 30 may be provided at one end at the deflector plate, while the other end is supported by a pivot joint.

In this embodiment the adjusting mechanism 30 comprises a first adjusting arm 32 and a second adjusting arm 34. One end of the first adjusting arm 32 is pivotally attached to the frame 4 and the other end is pivotally attached to the deflector plate 24 towards the front end 36 thereof. The second adjusting arm 34 is pivotally attached at one end to the frame 4, while the other end of the arm 34 engages an arcuate slot 38 that is located in towards the rear end 40 of the deflector plate. The first adjusting arm 32 may be adjusted to adjust the distance between the front end 36 of the deflector plate 24 and the rotor 17, and the second adjusting arm 34 may be adjusted to control the separation between the rear end 40 of the deflector plate and the rotor. The first and second adjusting arms may be adjusted independently, to control the separation of the deflector plate from the rotor at both ends thereof.

The adjusting mechanism is preferably configured to enable the positions of each of the front and rear ends of the working surface to be adjusted between first and second stop positions and at least one intermediate position. Each end of the working surface can therefore have at least three operating positions, allowing greater control over processing of the crop material. Optionally, each end of the working surface may have multiple intermediate positions and/or be adjustable continuously between the first and second stop positions, allowing an even greater degree of control.

Each adjusting arm 32, 34 is connected to a control mechanism that may be operated to adjust the position of the respective arm. This control mechanism may be manually operable, for example comprising a lever or screw adjuster, or it may include an actuator, such as an electric or hydraulic actuator, that allows the position of the deflector plate 24 to be adjusted remotely by a human operator of the conditioner unit, and/or automatically, for example by an electronic control system.

Figure 3:
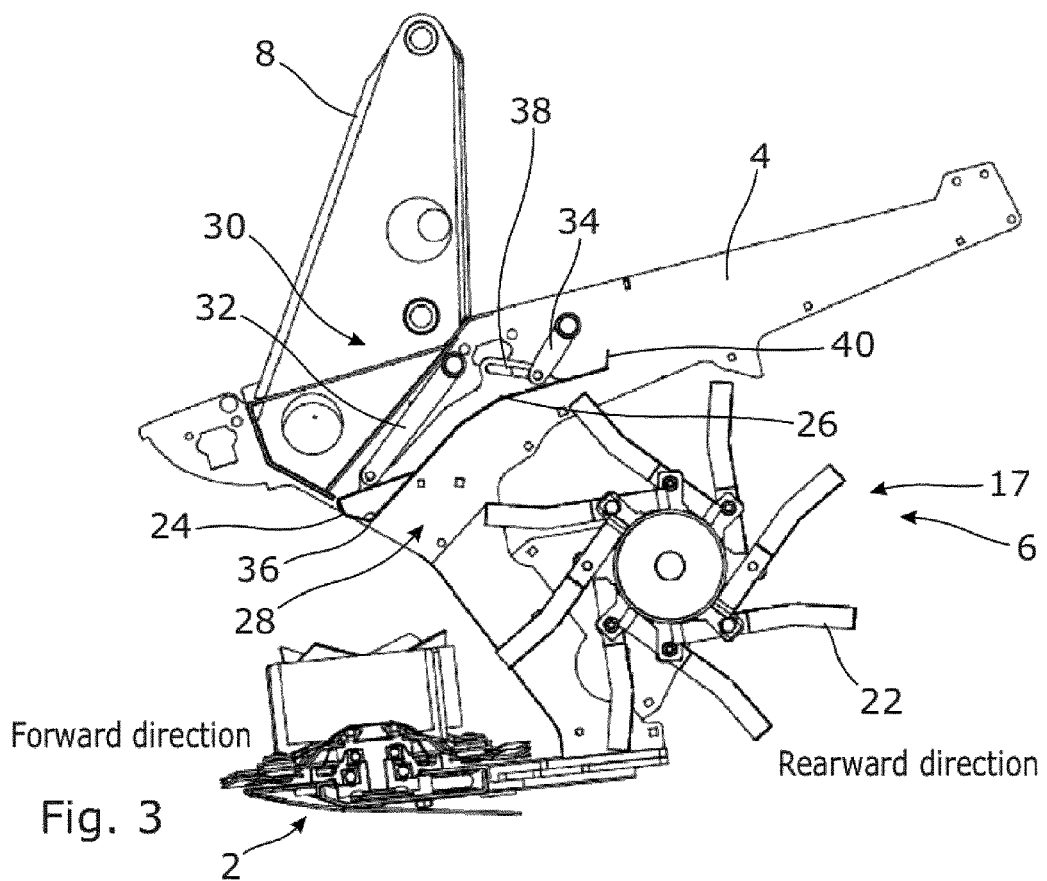
FIG. 3 is a sectional view on line A-A of FIG. 2, with the conditioner unit in a first operational condition.

In FIGS. 3-6 the deflector plate 24 is shown in various different operational configurations. In FIG. 3 the deflector plate is configured with the front end 36 displaced away from the rotor 17 and the rear end 40 positioned as close as possible to the rotor 17. This provides a conditioning channel 28 that is initially wide but becomes narrower towards the rear end of the channel. The open front end of the channel allows for a high feed rate of material into the channel, whereas the narrow rear end of the channel ensures that the cut crop material undergoes a high degree of conditioning.

Figure 4:
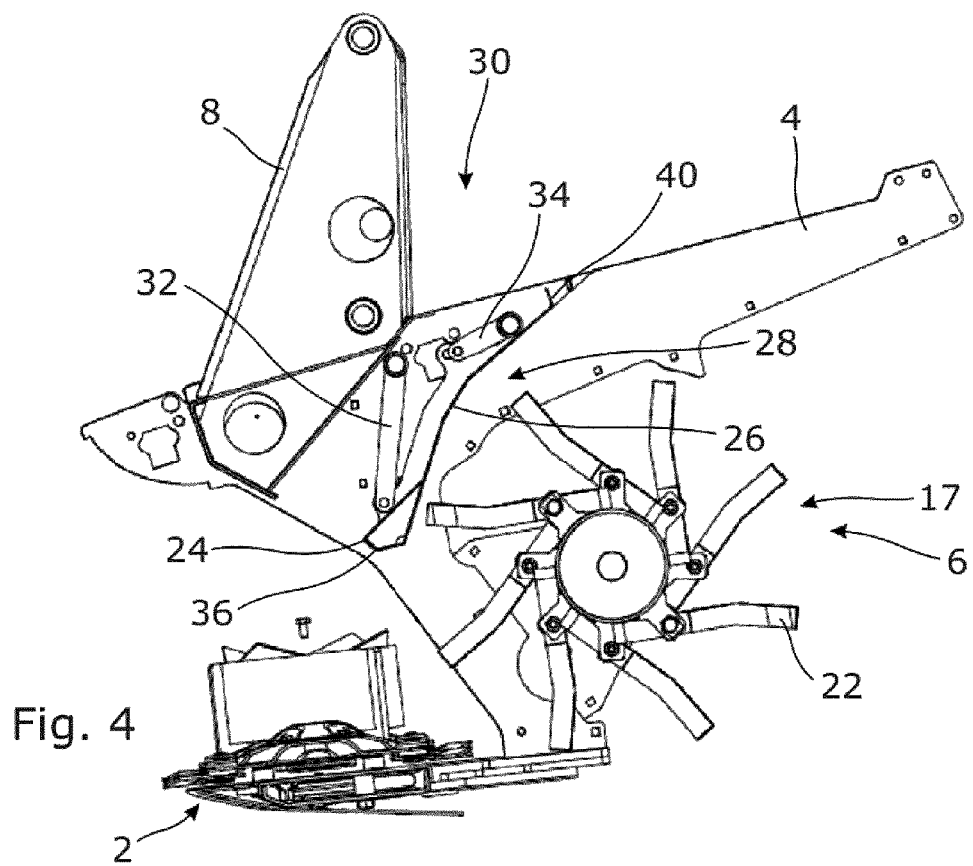
FIG. 4 is a cross-sectional view of the mower conditioner, with the conditioner unit in a second operational configuration.

In FIG. 4 the deflector plate is shown with the front end 36 located close to the rotor 17 and the rear end 40 spaced away from the rotor 17. The conditioning channel therefore starts very narrow and increases in width towards the rear end of the channel. This ensures a low feed rate of material into the channel, and a low level of conditioning.

Figure 5:
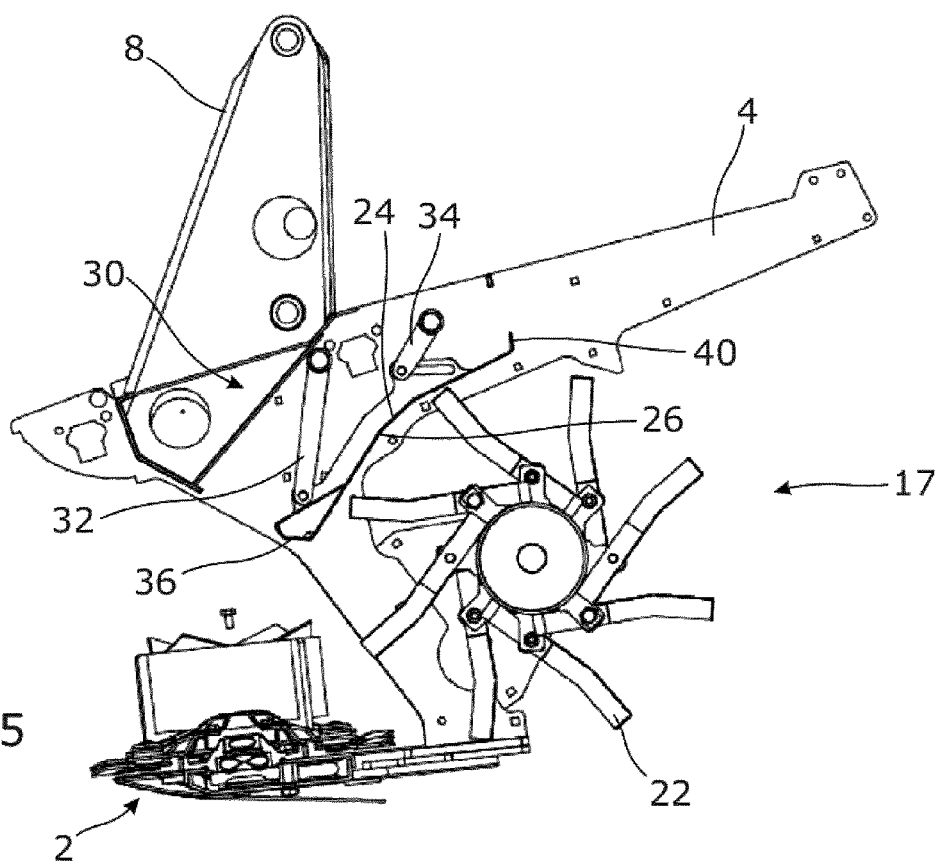
FIG. 5 is a sectional view of the mower conditioner, with the conditioner unit in a third operational configuration.

In FIG. 5 the deflector plate 24 is positioned close to the rotor 17 at both the front and rear ends. This provides a conditioning channel that is narrow from front to rear. This configuration is suited to low feed rates and provides a high degree of conditioning.

Figure 6:
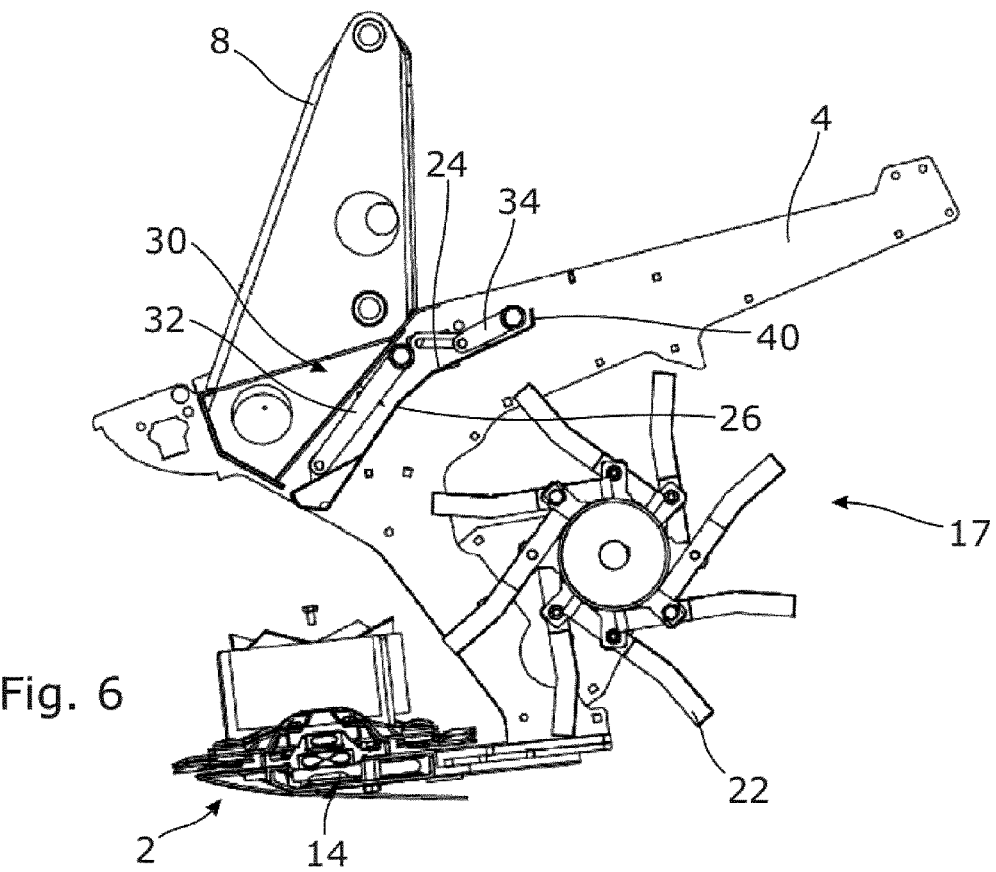
FIG. 6 is a cross-sectional view of the mower conditioner, with the conditioner unit in a fourth operation configuration.

Finally, in FIG. 6 the deflector plate 24 is shown spaced as far as possible from the rotor 17 at both the front and rear ends. This provides a wide conditioning channel that is suitable for a high feed rate of cut crop material, while providing a low degree of conditioning.

It should be understood that the adjusting mechanism may be configured to allow each end of the deflector plate to be located in one or more intermediate positions, in addition to the end positions described above.

If an adjusting mechanism is provided at only one end of the deflector plate, while the other end is supported by a pivot joint, the range of movement of the deflector plate will be more limited. However, it will still be possible to adjust the level of conditioning provided during operation of the conditioner unit.

The conditioner unit may be configured to have a number of different operational modes, including one or more of the following:

Manual (Pre-Set) Operation

In this mode the conditioner unit can be set in advance according to prevailing conditions, for example the density of the crop growing in the field, the moisture content of the crop, the operating speed of the tractor and prevailing weather conditions (both present and forecast). The position of the or each adjusting element can be set in advance according to one or more of the aforesaid factors, so as to provide a suitable rate of feed through the conditioner unit and an appropriate degree of conditioning. This requires only a manual adjusting mechanism, for example comprising levers or screw adjusters. However, actuators can also be used to pre-set the position of the deflector plate.

Operator Controlled (with On-Going Adjustment)

Where the adjusting mechanism includes one or more actuators that can be adjusted remotely, this allows for the possibility of adjusting the position of the deflector plate using in-cab controls during an on-going conditioning operation. The operator can then adjust the feed rate and or the degree of conditioning according to growing conditions in different parts of a field. For example, the degree of conditioning can be increased in areas of a field where the crop contains more moisture, and the feed rate can be increased in areas of the field where the crop is growing more densely.

Automatic Operation

To operate in automatic mode the conditioner unit includes one or more sensors that are able to sense operational conditions indicative of the current state of operation of the conditioner. These sensors may for example sense variables such as the force or pressure exerted on the deflector plate by the cut crop material as it passes through the conditioner unit, the flow rate of cut crop material, the torque transmitted to the rotor, or various other factors. The conditioner unit also includes a control unit that receives signals from the sensor or sensors and sends control signals to the actuators of the adjusting mechanism in order to adjust the position of the deflector plate according to the received signals. The control unit may be configured to adjust one of the front and rear adjusters during a conditioning operation, or both of the front and rear adjusters, if both adjusters are provided with actuators.

For example, the conditioning unit may be configured so that the front adjuster is pre-set to provide a fixed feed rate of material through the conditioner unit, while the rear adjuster is controlled automatically to provide a uniform level of processing/conditioning to the crop material. Alternatively, the rear adjuster may be pre-set to a fixed value to provide a constant level of processing/conditioning, while the front adjuster is adjusted automatically to provide a uniform feed rate of material through the conditioner unit. Alternatively, both the front and rear adjusting arms of the adjusting mechanism may be adjusted automatically so as to control both the feed rate of the crop material through the conditioner unit and the degree of conditioning.

Where the conditioner unit is part of a combined mower/conditioner device, various other factors that may affect operation of the conditioner unit may be sensed and/or controlled. These other factors may include, for example the height of the mower conditioner device, the angle of the cutter bar, the operational speeds of the mower unit and/or the conditioner unit, and various other factors. The control unit of the conditioner unit may be configured to take these other variable factors into account and to control the position of the deflector plate in order to provide an appropriate degree of conditioning to the cut crop material.

In addition, the control unit may be programmed to receive geographical position data, for example from a GPS unit, and use mapping information from a database to adjust the position of the deflector plate according to known variations in growing conditions within a particular geographical area, such as an agricultural field. By this method, the degree of conditioning can be adjusted automatically to take account of factors that affect the growing conditions within a field, such as variations in water availability, sunlight, soil type and so on. Such a system is particularly applicable to robotic (driverless) agricultural machines, while also being of use in conventional driver-operated machines.

It is also possible to adjust the position of the deflector plate during operation in order to reduce fuel consumption. For example, if the crop in different areas of a field requires a non-uniform level of conditioning (e.g. because the crop is drier in one area of the field), the gap between the deflector plate and the rotor can be increased in areas requiring a relatively low level of conditioning in order to reduce the rotational resistance acting on the rotor, thus reducing fuel consumption.

Figure 7:
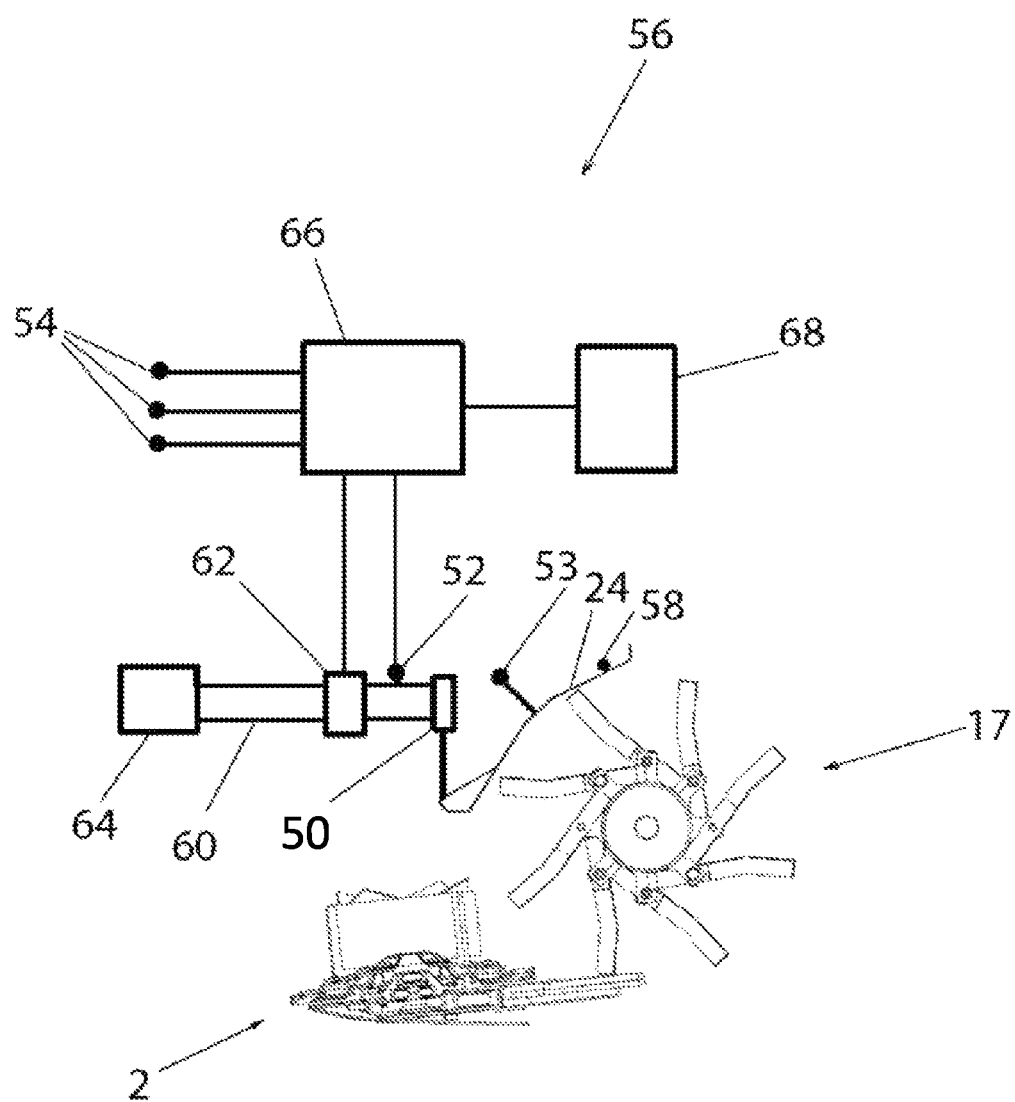
FIG. 7 is a system diagram illustrating a control system of a conditioner unit.

An embodiment of an adjusting mechanism that includes a control system for controlling the position of the deflector plate in a conditioner unit is illustrated schematically in FIG. 7. The adjusting mechanism includes an actuator 50 for adjusting the position of the deflector plate 24, a plurality of sensors 52, 54 for sensing an operational condition of the conditioning unit and a control system 56 that receives sensor signals from the sensors 52, 54 and controls actuation of the actuator 50 in response to the sensor signals to provide a desired level of conditioning during operation of the conditioner unit.

In this embodiment, the actuator 50 is connected a front edge of the deflector plate 24, while the rear edge of the deflector plate is supported by a pivot joint 58. The actuator 50 is thus configured to adjust the distance between the front edge of the deflector plate 24 and the rotor 17. Alternatively, the actuator 50 may connected a rear edge of the deflector plate 24, while the front edge of the deflector plate is supported by a pivot joint, or both the front and rear edges of the deflector plate may be connected to actuators.

In this embodiment, the actuator 50 comprises a hydraulic ram, which is coupled via fluid flow lines 60 and a set of control valves 62 to a hydraulic pump 64. A hydraulic fluid pressure sensor 52 is connected to sense the hydraulic pressure in at least one of the fluid flow lines, which provides an indication of the pressure or force acting on the deflector plate 24. Alternatively, the pressure or force can be sensed by a force sensor 53 that is connected directly to the deflector plate 24. Alternatively or additionally one or more sensors 54 may be provided for sensing other operational conditions, for example a force acting on the deflector element, a flow rate of crop material through the conditioning channel, a travelling speed of the conditioner unit, a power consumption value, or a rotational drive value of the drive mechanism.

The control system 56 includes a control unit 66 that is connected to receive a sensor signal from one or more of the sensors 52, 54. The control unit 66 is also connected to provide a control signal to control the position of the deflector plate 24. In this embodiment the control unit 66 is connected to the set of control valves 62 that controls the flow of hydraulic fluid to and from the hydraulic actuator 50. The control system 56 also optionally includes a control interface unit 68, that can be used by an operator of the conditioning unit to control operation of the conditioner unit.

The invention claimed is:

1. A conditioner unit for conditioning crop material, the conditioner unit comprising a rotor having a shaft that carries a plurality of conditioning elements, a drive mechanism for driving rotation of the rotor about an axis, a deflector element having a working surface that surrounds at least part of the circumference of the rotor to define a conditioning passage through which crop material is transported by rotation of the rotor, and an adjusting mechanism for adjusting the position of the deflector element relative to the rotor, wherein the adjusting mechanism includes an actuator for adjusting the position of the deflector element, a sensor for sensing an operational condition of the conditioning unit and a control system that is configured to receive a sensor signal from the sensor and controls actuation of the actuator in response to said sensor signal to adjust the position of the deflector element relative to the rotor so as to provide a desired level of conditioning during operation of the conditioner unit, wherein the control system is programmed to receive geographical position data and is configured to use mapping information from a database to adjust the position of the deflector element during operation of the conditioner unit according to known variations in growing conditions within a particular geographical area, wherein the control system is configured for automatic control of said actuator and wherein the control system is configured to adjust the position of the deflector element so as to maintain the desired level of conditioning at a substantially uniform level during operation of the conditioner unit.

2. The conditioner unit according to claim 1, wherein the desired level of conditioning is adjustable.

3. The conditioner unit according to claim 1, wherein said sensor is configured to sense at least one operational condition selected from a range comprising: a force acting on the deflector element, a flow rate of crop material through the conditioning channel, a travelling speed of the conditioner unit, a power consumption value, or a rotational drive value of the drive mechanism.

4. The conditioner unit according to claim 1, wherein the working surface has front and rear ends that define respectively input and output ends of the conditioning passage, the adjusting mechanism being configured to adjust the position of at least one of the ends of the working surface.

5. The conditioner unit according to claim 4, wherein the adjusting mechanism includes a first adjuster element for adjusting the position of the front end of the working surface, and a second adjuster element for adjusting the position of the rear end of the working surface.

6. The conditioner unit according to claim 5, wherein the first and second adjuster elements are independently operable.

7. The conditioner unit according to claim 5, wherein at least one of the adjuster elements comprises said actuator.

8. The conditioner unit according to claim 5, wherein at least one of the adjuster elements comprises a manual adjuster element.

9. The conditioner unit according to claim 8, wherein said manual adjuster element is configured for selectively positioning an end of the working surface in first or second stop positions or at least one intermediate position.

10. The conditioner unit according to claim 1, wherein the conditioner elements comprise flail elements pivotally attached to the shaft of the rotor.

11. A mower-conditioner device comprising the conditioner unit according to claim 1, and a mower unit that is configured to cut a crop material and feed the cut crop material to the conditioner unit.

12. The mower-conditioner unit according to claim 11, wherein the mower unit comprises a plurality of rotary cutter elements.

13. A conditioner unit for conditioning crop material, the conditioner unit comprising a rotor having a shaft that carries a plurality of conditioning elements, a drive mechanism for driving rotation of the rotor about an axis, a deflector element having a working surface that surrounds at least part of the circumference of the rotor to define a conditioning passage through which crop material is transported by rotation of the rotor, and an adjusting mechanism for adjusting the position of the deflector element relative to the rotor, wherein the adjusting mechanism includes an actuator for adjusting the position of the deflector element, a sensor for sensing an operational condition of the conditioning unit and a control system that is configured to receive a sensor signal from the sensor and controls actuation of the actuator in response to said sensor signal to adjust the position of the deflector element relative to the rotor so as to provide a desired level of conditioning during operation of the conditioner unit, wherein the control system is programmed to receive geographical position data and is configured to use mapping information from a database to adjust the position of the deflector element during operation of the conditioner unit according to known variations in growing conditions within a particular geographical area, and wherein the control system is configured to adjust the position of the deflector element so as to maintain the desired level of conditioning at a substantially uniform level during operation of the conditioner unit, wherein the working surface has front and rear ends that define respectively input and output ends of the conditioning passage, wherein the adjusting mechanism includes a first adjuster element for adjusting the position of the front end of the working surface, and a second adjuster element for adjusting the position of the rear end of the working surface, both the front and rear adjusting arms of the adjusting mechanism may be adjusted automatically so as to control both the feed rate of the crop material through the conditioner unit and the degree of conditioning.

14. The conditioner unit according to claim 13, wherein said sensor is configured to sense at least one operational condition selected from a range comprising: a force acting on the deflector element, a flow rate of crop material through the conditioning channel, a travelling speed of the conditioner unit, a power consumption value, or rotational drive value of the drive mechanism.

15. The conditioner unit according to claim 13 wherein the first and second adjuster elements are independently operable.

16. The conditioner unit according to claim 13 wherein the adjuster element is configured for adjusting the distance between the front end and/or the rear end of the working surface and the axis of the rotor or in a direction around the circumference of the rotor, or both.

17. A conditioner unit for conditioning crop material, the conditioner unit comprising a rotor having a shaft that carries a plurality of conditioning elements, a drive mechanism for driving rotation of the rotor about an axis, a deflector element having a working surface that surrounds at least part of the circumference of the rotor to define a conditioning passage through which crop material is transported by rotation of the rotor, and an adjusting mechanism for adjusting the position of the deflector element relative to the rotor, wherein the adjuster element is configured for adjusting the distance between the front end and/or the rear end of the working surface and the axis of the rotor or in a direction around the circumference of the rotor, or both; wherein the adjusting mechanism includes an actuator for adjusting the position of the deflector element, a sensor for sensing an operational condition of the conditioning unit and a control system that is configured to receive a sensor signal from the sensor and controls actuation of the actuator in response to said sensor signal to adjust the position of the deflector element relative to the rotor so as to provide a desired level of conditioning during operation of the conditioner unit, wherein the control system is programmed to receive geographical position data and is configured to use mapping information from a database to adjust the position of the deflector element during operation of the conditioner unit according to known variations in growing conditions within a particular geographical area, and wherein the control system is configured to adjust the position of the deflector element so as to maintain the desired level of conditioning at a substantially uniform level during operation of the conditioner unit.

18. The conditioner unit according to claim 17, wherein the working surface has front and rear ends that define respectively input and output ends of the conditioning passage, wherein the adjusting mechanism includes a first adjuster element for adjusting the position of the front end of the working surface, and a second adjuster element for adjusting the position of the rear end of the working surface, both the front and rear adjusting arms of the adjusting mechanism may be adjusted automatically so as to control both the feed rate of the crop material through the conditioner and the degree of conditioning.

19. The conditioner unit according to claim 18, wherein the first and second adjuster elements are independently operable.

20. The conditioner unit according to claim 17, wherein said sensor is configured to sense at least one operational condition selected from a range comprising: a force acting on the deflector element, a flow rate of crop material through the conditioning channel, a travelling speed of the conditioner unit, a power consumption value, or a rotational drive value of the drive mechanism.

* * * * *